(12) United States Patent
Chen et al.

(10) Patent No.: US 12,126,904 B2
(45) Date of Patent: Oct. 22, 2024

(54) CAMERA MODULE, INFORMATION PROCESSING METHOD, AND ELECTRONIC DEVICE FOR IMAGE STABILIZATION CONTROL

(71) Applicant: Lenovo (Beijing) Limited, Beijing (CN)

(72) Inventors: Jiefeng Chen, Beijing (CN); Chunyu Zhang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 283 days.

(21) Appl. No.: 17/654,594

(22) Filed: Mar. 13, 2022

(65) Prior Publication Data

US 2023/0086451 A1     Mar. 23, 2023

(30) Foreign Application Priority Data

Sep. 22, 2021    (CN) .......................... 202111105292.1

(51) Int. Cl.
*H04N 23/68*    (2023.01)
*G02B 7/02*    (2021.01)
*G02B 27/64*    (2006.01)

(52) U.S. Cl.
CPC ............. *H04N 23/687* (2023.01); *G02B 7/02* (2013.01); *G02B 27/646* (2013.01); *H04N 23/6812* (2023.01)

(58) Field of Classification Search
CPC .. H04N 23/687; H04N 23/6812; H04N 23/54; H04N 23/685; G02B 27/646
See application file for complete search history.

(56) References Cited

U.S. PATENT DOCUMENTS

2024/0004265 A1*    1/2024   Liu .......................... H01F 7/081

FOREIGN PATENT DOCUMENTS

CN          211266959 U         8/2020

* cited by examiner

*Primary Examiner* — Nicholas G Giles
(74) *Attorney, Agent, or Firm* — ANOVA LAW GROUP, PLLC (57) ABSTRACT

The present disclosure provides a camera module, an information processing method, and an electronic device. The camera module includes a casing and a lens assembly movably connected to the casing. The lens assembly includes a lens group including a plurality of lenses, and the lens group is fixedly arranged in a lens barrel. The camera module further includes a sensor assembly movably connected to the casing. The sensor assembly is located under the lens assembly. The camera module also includes a driving assembly, which drives the lens assembly and/or the sensor assembly to move based on a control signal.

17 Claims, 6 Drawing Sheets

CAMERA MODULE, INFORMATION PROCESSING METHOD, AND ELECTRONIC DEVICE FOR IMAGE STABILIZATION CONTROL

CROSS REFERENCE TO RELATED APPLICATION

The present application claims priority to Chinese Patent Application No. 202111105292.1, filed on Sep. 22, 2021, the entire content of which is incorporated herein by reference.

TECHNICAL FIELD

The disclosure generally relates to the field of camera technology, and in particular, to a camera module, an information processing method, and an electronic device.

BACKGROUND

Optical image stabilization relies on the structure of a special lens or charge-coupled device (CCD) photosensitive element to reduce the image instability caused by an operator's shaking during use. The principle is that the gyroscope in the lens detects the movement, and transmits the signal to the microprocessor to immediately calculate the displacement amount to be compensated, and then compensates according to the shaking direction and displacement of the lens through the compensation lens group, thereby effectively avoiding image blur caused by camera vibration. The existing optical image stabilization for small devices such as mobile phones is based primarily on sensor movement image stabilization. The principle is to set up a movable image sensor to offset the shake from the lens image. However, due to dimension constraints, the image stabilization space is significantly restricted, which affects the effect of optical image stabilization.

SUMMARY

One aspect of the present disclosure provides a camera module. The camera module includes a casing; a lens assembly movably connected to the casing, the lens assembly including a lens group, the lens group including a plurality of lenses, and the lens group being fixedly arranged in a lens barrel; a sensor assembly movably connected to the casing, the sensor assembly being located under the lens assembly; and a driving assembly driving the lens assembly and/or the sensor assembly to move based on a control signal.

Another aspect of the present disclosure provides an information processing method. The method includes obtaining a control signal when a camera module is called; and providing a driving electrical current for the camera module, based on the control signal. The driving electrical current is supplied to a driving assembly of the camera module to provide a driving force that controls a movement of a lens assembly of the camera module and/or a movement of a sensor assembly of the camera module.

Another aspect of the present disclosure provides an electronic device. The electronic device includes a camera module including: a casing, a lens assembly, a sensor assembly and a driving assembly. The lens assembly is movably connected to the casing. The lens assembly includes a lens group including a plurality of lenses. The lens group is fixedly arranged in a lens barrel. The sensor assembly is movably connected to the casing. The sensor assembly is located under the lens assembly. The driving assembly drives the lens assembly and/or the sensor assembly to move based on a control signal. The electronic device further includes a memory configured for storing computer programs executable on a processor; and the processor configured to obtain the control signal when executing the computer programs.

The camera module, the information processing method, and the electronic device disclosed herein can be used for taking pictures. The lens assembly and the sensor assembly can move separately or simultaneously relative to the casing through the driving of the driving assembly. The movement of the lens assembly and the sensor assembly relatively to the casing enables the lens assembly and the sensor assembly to form a variety of different positional relationships inside the casing, which may be more suitable for the needs of different camera scenarios.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

The following drawings are merely examples for illustrative purposes according to various disclosed embodiments and are not intended to limit the scope of the present disclosure.

The above and other objects, features and advantages of exemplary embodiments of the present disclosure will become readily understood by reading the following detailed description with reference to the accompanying drawings. In the accompanying drawings, exemplary embodiments of the present disclosure are shown by way of example and are not intended to be limited. In the drawings, the same or corresponding reference numerals denote the same or corresponding parts.

The reference numerals in the drawings are as follows: 1 casing; 11 accommodating cavity; 12 protective iron case; 121 mirror hole; 13 base; 2 lens assembly; 21 lens group; 22 lens barrel; 3 sensor assembly; 31 chip; 32 circuit board; 4 driving assembly; 41 first set of magnets; 42 second set of magnets; 43 coil; 51 carrier; 52 first suspension; 53 glue; 61 tray; 62 second suspensions; 71 upper elastic sheet; 72 lower elastic sheet; and 73 pedestal.

DETAILED DESCRIPTION

Reference will now be made in detail to exemplary embodiments of the disclosure, which are illustrated in the accompanying drawings. Wherever possible, the same reference numbers will be used throughout the drawings to refer to the same or similar parts.

In order to make the purpose, features and advantages of the present disclosure more apparent and understandable, the technical solutions in the exemplary embodiments of the present disclosure will be clearly and completely described below with reference to the accompanying drawings in the exemplary embodiments of the present disclosure. Apparently, the described exemplary embodiments are only a part of the embodiments of the present disclosure, but not all of the embodiments of the present disclosure. Based on the exemplary embodiments described in this disclosure, all other embodiments obtained by those skilled in the art without creative efforts shall fall within the protection scope of the present disclosure.

Figure 1:
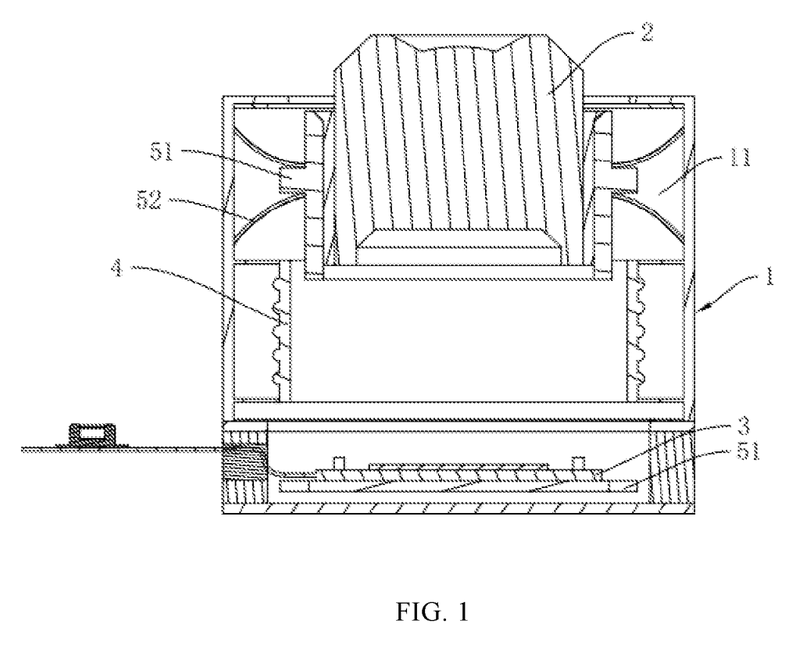
FIG. 1 illustrates a schematic cross-sectional view of a camera module according to one embodiment of the present disclosure.
Figure 2:
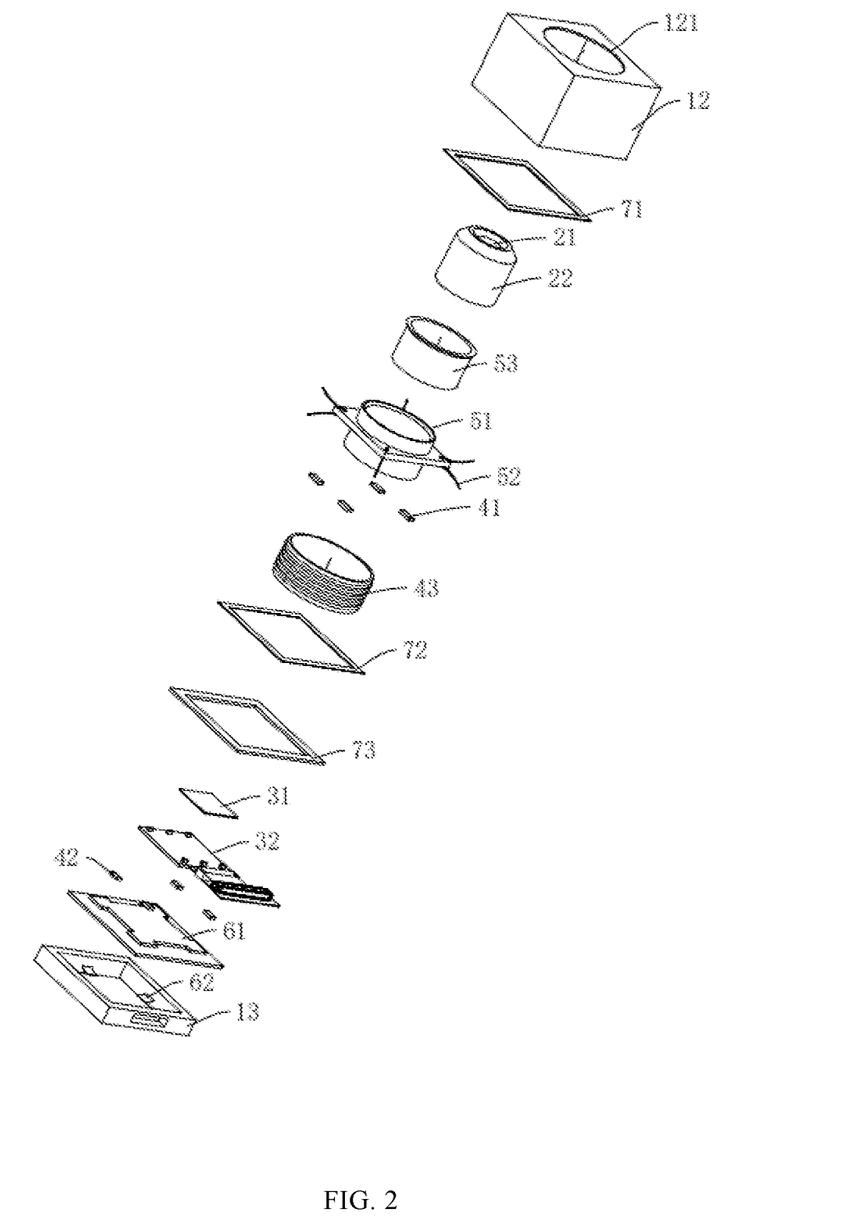
FIG. 2 illustrates a schematic exploded diagram of a camera module according to one embodiment of the present disclosure.

FIG. 1 is a schematic cross-sectional view of a camera module according to an embodiment of the present disclosure. FIG. 2 is a schematic exploded diagram of a camera module according to an embodiment of the present disclosure.

Referring to FIGS. 1 and 2, one aspect of the present disclosure provides a camera module. The camera module may include: a casing 1; a lens assembly 2 movably connected to the casing 1, where the lens assembly 2 includes a lens group 21 including multiple lenses or formed by a plurality of lenses, and the lens group 21 is fixedly arranged in a lens barrel 22; a sensor assembly 3 movably connected to the casing 1, where the sensor assembly 3 is located under the lens assembly 2; and a driving assembly 4, where the driving assembly 4 is configured to drive the lens assembly 2 and/or the sensor assembly 3 to move based on a control signal.

The camera module provided in the exemplary embodiment of the present disclosure may be used for taking pictures. Through the driving of the driving assembly 4, both the lens assembly 2 and the sensor assembly 3 can move relative to the casing 1. Through the movement of the lens assembly 2 and the sensor assembly 3, the lens assembly 2 and the sensor assembly 3 can form a variety of different positional relationships, which is more suitable for the needs of different imaging scenarios.

Specifically, the camera module includes the casing 1. The casing 1 is configured for installing the lens assembly 2, the sensor assembly 3 and the driving assembly 4 to form the camera module, which is convenient for installation and transportation of the camera module.

The lens assembly 2 includes the lens group 21 and the lens barrel 22. The lens group 21 is including a plurality of lenses. According to needs, the lenses can be any types of lenses and be in any quantities, which are not limited in this disclosure. The lens assembly 2 can be used to capture videos and still images. The multiple lenses are fixedly arranged inside the lens barrel 22 to form the lens assembly 2. The lens assembly 2 can be movably connected to the casing 1 through the lens barrel 22 so that the lens assembly 2 can move relative to the casing 1 under force. Specifically, according to the actual force, the lens assembly 2 can move relative to the casing 1 at any angle, such as in a horizontal direction, a non-horizontal direction, or the like.

The sensor assembly 3 may include various components used for light sensing and data processing. The sensing component 3 processes the images captured by the lens assembly 2 and converts them into digital signals that can be recognized by a computer. Similarly, the sensor assembly 3 is also movably connected to the casing 1, so that the sensor assembly 3 can move relative to the casing 1 under force. Similarly, according to the actual force, the lens assembly 3 can move relative to the casing 1 at any angle, such as in a horizontal direction, a non-horizontal direction, or the like.

The driving assembly 4 is arranged in the casing 1 and is configured to generate a driving force when obtaining a control signal, so as to make the lens assembly 2 and/or the sensor assembly 3 move relative to the casing 1. Specifically, in the case of different control signals, the direction of the driving force of the driving assembly 4 can be adjusted adaptively. For example, when the control signal is a focus control signal, the lens assembly 2 and the sensor assembly 3 can move relatively along the axis of the casing 1; and when the control signal is an image stabilization control signal (also referred to an anti-vibration control signal), the lens assembly 2 and the sensor assembly 3 can move relatively in the horizontal plane of the casing 1. According to the design of the installation position of the driving assembly 4, the lens assembly 2 and the sensor assembly 3 can be moved to any position inside the casing 1.

Further, there may be one or more driving assemblies 4. According to the design of the driving assembly 4, one driving assembly 4 can be connected to the lens assembly 2 and the sensor assembly 3 respectively, so as to realize the control of the lens assembly 2 and the sensor assembly 3 through the one driving assembly 4. The driving assembly 4 can also be a plurality of driving assemblies, and are connected to the corresponding lens assembly 2 or the sensor assembly 3 through the multiple driving assemblies 4, so as to realize the precise control of the lens assembly 2 and the sensor assembly 3. It should be noted that, according to the structural design of the driving assembly 4, the lens assembly 2 and the sensor assembly 3 can be controlled to move relatively to the casing 1 simultaneously, or move relatively to the casing 1 successively. Specifically, in the present disclosure, various driving modes can be used to realize the driving of the lens assembly 2 and the sensor assembly 3 by the driving assembly 4, including but not limited to, electric drive, magnetic drive, mechanical drive, and the like.

To facilitate the understanding of the foregoing embodiments, several specific implementation scenarios are provided below.

Figure 3:
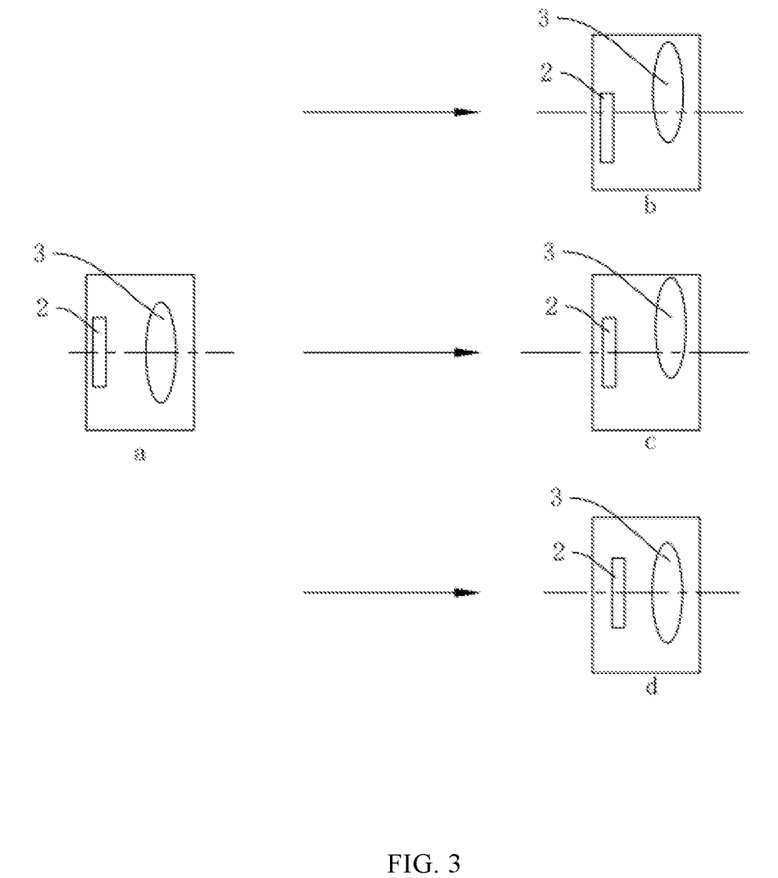
FIG. 3 illustrates a schematic diagram of the principle of a camera module according to one embodiment of the present disclosure.

FIG. 3 is a first schematic diagram of the principle of a camera module according to an embodiment of the present disclosure.

Referring to FIGS. 1 and 3, in a first specific implementation scenario, the camera module is arranged on an electronic device. It is connected to the electronic device through the casing 1. The casing 1 is provided with an accommodating cavity 11 for accommodating the lens assembly 2 and the sensor assembly 3. A first driving assembly is connected to an upper portion of the casing 1, and the lens assembly 2 is movably connected to an upper porting of the accommodating cavity 11 through the first driving assembly. The lens assembly 2 is controlled to move relatively to the casing 1 through the first driving assembly. A second driving assembly is connected to a lower portion of the casing 1, and the sensor assembly 3 is movably connected to a lower portion of the accommodating cavity 11 through the second driving assembly. The sensor assembly 3 is controlled to move relatively to the casing 1 through the second driving assembly. When the driving assembly 4 does not drive the lens assembly 2 and/or the sensor assembly 3 to move relative to the casing 1, the lens assembly 2 and the sensor assembly 3 are in a coaxial state. According to needs, the first driving assembly and the second driving assembly can be selected as any one of an air cylinder, a motor, a magnet, and the like. In a stationary state, as shown in state a of FIG. 3, the lens assembly 2 and the sensor assembly 3 in the casing 1 are kept coaxially arranged.

When the electronic device obtains a focus control signal, as shown in state b of FIG. 3, the first driving assembly drives the lens assembly 2 to move up and down relative to the central axis of the casing 1, and the second driving assembly drives the sensor assembly 3 to move up and down relative to the central axis of the casing 1, to realize the camera focusing function. After the task is completed, the first driving assembly and the second driving assembly stop driving, and the camera module is reset to the state a in FIG. 3.

When the electronic device obtains an image stabilization control signal, the first driving assembly drives the lens assembly 2 to move relative to the horizontal plane of the casing 1, and the second driving assembly drives the sensor assembly 3 move relative to the horizontal plane of the casing 1, to realize the image stabilization function of the camera module. For illustration purposes, the state d in FIG. 3 merely illustrates a situation that only the lens assembly 2 moves, although the lens assembly 2 and/or the sensor assembly 3 are movable, the amount of vibration compensation can be increased, thereby improving the performance of vibration compensation. The camera module provided in this disclosure is capable of capturing higher quality images. After the task is completed, the first driving assembly and the second driving assembly stop driving, and the camera module is reset to the state a in FIG. 3.

In a second specific implementation scenario, the camera module is arranged on an electronic device. It is connected to the electronic device through the casing 1. The casing 1 is provided with an accommodating cavity 11 for accommodating the lens assembly 2 and the sensor assembly 3. A first driving assembly is connected to the casing 1 and is respectively drivingly connected to the lens assembly 1 and the sensor assembly 3, so that the lens assembly 2 is movably connected to an upper portion of the accommodating cavity 11 through the first driving assembly, and the sensor assembly 3 is movably connected to an lower portion of the accommodating cavity 11 through the first driving assembly. The lens assembly 2 and the sensor assembly 3 are controlled to move relative to the casing 1 through the first driving assembly. When the driving assembly 4 does not drive the lens assembly 2 and/or the sensor assembly 3 to move relative to the casing 1, the lens assembly 2 and the sensor assembly 3 are in a coaxial state. According to needs, the first driving assembly can be selected as any one of an air cylinder, a motor, a magnet, or the like. In a stationary state, as shown in state a in FIG. 3, the lens assembly 2 and the sensor assembly 3 in the casing 1 are kept coaxially arranged.

When the electronic device obtains a focus control signal, similarly, referring to the state b in FIG. 3, the first driving assembly drives the lens assembly 2 and the sensor assembly 3 to move up and down relative to the central axis of the casing 1 respectively, so as to realize the focus function of the camera. After the task is completed, the first driving assembly and the second driving assembly stop driving, and the camera module is reset to the state a in FIG. 3.

When the electronic device obtains an image stabilization control signal, similarly, the first driving assembly drives the lens assembly 2 (e.g., as illustrated in FIG. 3d) and the sensor assembly 3 to move relative to the horizontal plane of the casing 1 respectively, so as to realize the image stabilization function of the camera module. After the task is completed, the first driving assembly and the second driving assembly stop driving, and the camera module is reset to the state a in FIG. 3.

In the present disclosure, both the lens assembly 2 and the sensor assembly 3 can move relative to the casing 1, therefore, the positions between the lens assembly 2 and the sensor assembly 3 can be more diverse. Specifically, in the present disclosure, through the driving assembly 4, the horizontal distance and/or the vertical distance between the lens assembly 2 and the sensor assembly 3 can be made farther, and can vary significantly, so that it can be more suitable for various camera scenarios.

In an embodiment, the control signal is an image stabilization control signal. The driving assembly 4 drives the lens assembly 2 and the sensor assembly 3 to move simultaneously based on the image stabilization control signal, and the moving directions of the lens assembly 2 and the sensor assembly 3 are opposite.

The present disclosure can further be applicable to a camera module with an image stabilization function. Specifically, the image stabilization control signal in the present disclosure can be obtained based on optical image stabilization (ois). A gyroscope can be arranged in the lens camera module. When the gyroscope detects a small movement, the signal is transmitted to a microprocessor, and the microprocessor determines the amount of displacement that needs to be compensated. The lens assembly 2 and the sensor assembly 3 are driven to move simultaneously by the driving assembly 4, and the lens assembly 2 and the sensor assembly 3 are moved in opposite directions, so that the lens assembly 2 and the sensor assembly 3 can spend less time to achieve the specified compensation amount. Thereby, the image blur caused by the vibration of the camera can be effectively overcame.

To facilitate the understanding of the foregoing embodiments, a specific implementation scenarios is provided below.

In this specific implementation scenario, the camera module is arranged on an electronic device. It is connected to the electronic device through the casing 1. The driving assembly 4 is connected to the casing 1 and is respectively drivingly connected to the lens assembly 2 and the sensor assembly 3, so that the lens assembly 2 is movably connected to an upper portion of the accommodating cavity 11, and the sensor assembly 3 is movably connected to a lower portion of the accommodating cavity 11. When the driving assembly 4 provides driving force, the lens assembly 2 and the sensor assembly 3 are moved simultaneously relative to the casing 1, and the moving directions of the lens assembly 2 and the sensor assembly 3 are opposite. According to needs, the first driving assembly and the second driving assembly can be selected as any one of air cylinders, motors, magnets, and the like.

When the electronic device detects that the image captured by the camera module is unstable due to shaking/vibration during use by an operator, an image stabilization control signal is obtained. The image stabilization control signal is used to instruct the driving assembly 4 to provide a driving force with specified energy.

The driving assembly 4 provides a driving force with specified energy according to the image stabilization control signal, so that the lens assembly 2 and the sensor assembly 3 move simultaneously in the horizontal plane of the casing 1, and the moving directions of the lens assembly 2 and the sensor assembly 3 are opposite to achieve the specified image stabilization amount for overcoming image blurry caused by camera vibration. Since the moving directions of the lens assembly 2 and the sensor assembly 3 are opposite, the actual moving distance of the two can be minimized. Also because the lens assembly 2 and the sensor assembly 3 move simultaneously, the movement time can be reduced, so that it takes less time to achieve the required amount of compensation.

In one embodiment, the driving assembly 4 can include: a first set of magnets 41 which is fixed to the lens assembly 2; a second set of magnets 42, which is fixed to the sensor assembly 3; and a coil 43. The first set of magnets 41 and the second set of magnets 42 are located in the spatial scope of the coil 43. The first set of magnets 41 is located at a first end of the spatial scope of the coil 43, and the second set of magnets 42 is located at a second end of the spatial scope of the coil 43.

In the present disclosure, the driving assembly 4 includes: the first set of magnets 41; the second set of magnets 42; and the coil 43. The lens assembly 2 and the sensing assembly 3 are driven by electromagnetic driving through cooperation between the magnets and the coil 43.

In the present disclosure, the first set of magnets 41 may include one or more magnets. When the first set of magnets 41 includes one magnet, the magnet can be fixed to any position in the middle or the edge of the lens assembly 2. According to needs, the magnet can be a magnet block, or a magnet ring or disk matching the shape of the bottom of the lens assembly 2. The second set of magnets 42 are similarly fixed to the sensor assembly 3, which will not be described in detail. In the present disclosure, the coil 43 is fixed in the casing 1, and the coil 43 is provided with electrical current to generate a magnetic field. It should be explained that the spatial range of the coil 43 indicates a magnetic field range of the coil 43 in which the coil 43 can drive the lens assembly 2 and the sensor assembly 3 to move when the coil 43 is energized with the electrical current. It can be understood that, according to the right-hand rule, the magnetic field of the coil 43 can exist in the inner range, the outer range, the upper range and the lower range. That is, according to the requirements of the driving direction, the first set of magnets 41 corresponding to the lens assembly 2 and the second set of magnets 42 corresponding to the sensor assembly 3 can be placed in the inner, outer, upper and lower ranges of the coil 43. Similarly, according to the requirements of the movement direction of the lens assembly 2 and the sensor assembly 3, the coil 43 can also be placed in the inner range, outer range, upper range and lower range of the first set of magnets 41 and/or the second set of magnets 42 corresponding to the sensor assembly 3. In the present disclosure, the number and position of the coil 43 are not limited and may be determined according to the actual situation.

In one embodiment of the present disclosure, the coil 43 is fixed inside the accommodating cavity 11 of the casing 1, specifically in the middle of the accommodating cavity 11, and the axis of the coil 43 coincides with the central axis of the accommodating cavity 11. The lens assembly 2 is located at the first end of the coil 43. The first set of magnets 41 includes a plurality of magnet blocks, fixed to an end of the lens assembly 2 facing the coil 43, and evenly fixed to the edge of the end of the lens assembly 2 with a ring track. The end of the lens assembly 2 facing the coil 43 is inserted inside the coil 43, so that the first set of magnets 41 is located inside the coil 43, and there is a gap between the lens assembly 2 and the first set of magnets 41 and the inner wall of the coil 4. As such, the lens assembly 2 can move inside the coil 43 under the driving of the magnetic field of the coil 43.

The sensor assembly 3 is located at a second end of the coil 43, and the first end of the coil 43 is opposite to the second end of the coil 43. The second set of magnets 42 also includes a plurality of magnet blocks, which are fixed on an end of the sensor assembly 3 facing the coil 43, and are evenly fixed on the edge of the end of the sensor assembly 3 with a ring track. The second set of magnets 42 are close to but not in contact with the coil 43. With this arrangement, the present disclosure can save the overall space of the casing 1, and further because the first set of magnets 41 and the second set of magnets 42 are both close to the coil 43, the magnetic field lines are strong and a larger driving force can be obtained.

When the coil 43 is not energized by providing an electrical current, the lens assembly 2, the coil 43 and the sensor assembly 3 are arranged coaxially.

In one embodiment, the first set of magnets 41 is including a plurality of first magnets, and the second set of magnets 42 is including a plurality of second magnets. Each of the plurality of first magnets has a different magnetic pole from its corresponding second magnet.

In order to make the movement directions of the lens assembly 2 and the sensor assembly 3 be opposite, in the present disclosure, the magnetic pole of each first magnet is different than the magnetic pole of the second magnet at the corresponding position. Thus, the lens assembly 2 and the sensor assembly 3 are driven by the coil 43 and the magnets to move in different directions.

In one embodiment, the coil 43 generates a first driving force with the first set of magnets 41 based on the electrical current provided by the image stabilization control signal; and the coil 43 generates a second driving force with the second set of magnets 42 based on the electrical current provided by the image stabilization control signal. The direction of the first driving force and the direction of the second driving force are different.

Specifically, in the present disclosure, by setting the first set of magnets 41 and the second set of magnets 42 relative to the coil 43 in specific position ranges and magnetic poles, and when the coil 43 is energized by providing the electrical current, the moving direction of the lens assembly 2 caused by the first driving force generated by the coil 43 to the first set of magnets 41 is opposite to the moving direction of the sensor assembly 3 caused by the second driving force generated by the coil 43 to the second set of magnets 42.

In one embodiment, the plurality of first magnets are fixedly arranged on a carrier 51. The lens assembly 2 is in a suspended state through the carrier 51 and the first suspension 52 connected to the carrier 51, and is moved under the first driving force. The movement of the lens assembly 2 is relative to the horizontal plane of the casing 1.

Specifically, in this disclosure, the lens assembly 2 is fixed on the carrier 51, and the carrier 51 is connected with the casing 1 through the first suspension 52. The lens assembly 2 can be in a suspended state relative to the casing 1, and the plurality of first magnets are fixedly arranged on the carrier 51. The first suspension 52 is made of a deformable material, so that when the driving assembly 4 generates the first driving force, the first suspension 52 can be deformed relative to the casing 1. The carrier 51 drives the lens assembly 2 to move relative to the casing 1. Further, the deformation direction of the first suspension 52 is a deformation relative to the horizontal plane of the casing 1, so that the movement of the lens assembly 2 is relative to the horizontal plane of the casing 1. Specifically, the first suspension 52 can be selected as a suspension wire, a flexible elastic sheet, a spring or other components with certain elasticity. Further, the suspension wire is made of metal wire.

In one embodiment, a plurality of second magnets are fixedly arranged on the tray 61. The sensor assembly 3 is in a suspended state through the tray 61 and the second suspension 62 connected to the tray 61, and is moved under the second driving force. The movement of the sensor assembly 3 is relative to the horizontal plane of the casing 1.

Specifically, in the present disclosure, the sensor assembly 3 is fixed on the tray 61, and the tray 61 is connected to the casing 1 through the second suspension 62, so that the sensor assembly 3 can be in a suspended state relative to the casing 1. The plurality of second magnets are fixedly arranged on the tray 61. The second suspension 62 is also made of a deformable material, so that when the driving assembly 4 generates a second driving force, the second suspension 62 can be deformed relative to the casing 1, thereby the tray 61 drives the sensor assembly 3 to move relative to the casing 1. Further, the deformation direction of the second suspension 62 is a deformation relative to the horizontal plane of the casing 1, so that the movement of the sensor assembly 3 is relative to the horizontal plane of the casing 1. Specifically, the first suspension 62 can be selected as a suspension wire, a flexible elastic sheet, a spring or other components with certain elasticity. Further, the flexible elastic sheet is made of a bent metal sheet. The first suspension 52 may be the same as or different from the second suspension 62.

In the actual scenarios, the selection of the first suspension 52 and the second suspension 62 can be determined according to the weight of the lens assembly 2 and the sensor assembly 3. If the suspension needs to load a large weight, a flexible elastic sheet is used for connection. If the suspension needs to load a small weight, a suspension wire is used for connection. In one embodiment, the first suspension 52 is a suspension wire, and the second suspension 62 is a flexible elastic sheet.

The following description will provide an implemented overall structure to specifically describe the camera module disclosed herein. The camera module includes a casing 1 including a protective iron shell 12 and a base 13. An accommodating cavity 11 is formed inside the protective iron shell 12, and the base 13 is covered on the protective iron shell 12 to realize the sealing of the bottom of the protective iron shell 12. A mirror hole 121 is formed at one end of the protective iron shell 12 facing away from the base 13. The lens barrel 22 of the lens assembly 2 passes through the lens hole 121. A plurality of lens groups 21 are arranged in the lens barrel 22, and the lens assembly 2 collects images through the lens groups 21.

The lens assembly 2 is bonded to the carrier 51 by glue 53. The edge of the carrier 51 is connected to a plurality of suspension wires, and the ends of the suspension wires are connected to the inner wall of the protective iron shell 12, so as to movably connect the carrier 51 to one end of the protective iron shell 12 having the mirror hole 121. The end of the carrier 51 facing away from the mirror hole 121 is fixed with a first set of magnets 41. The first set of magnets 41 includes a plurality of magnet blocks, and the plurality of magnet blocks are equidistantly wound around the edge of the carrier 51 facing the coil 43.

The accommodating cavity 11 is located directly below the carrier 51 and is fixed with the coil 43. The coil 43 is fixed to the protective iron shell 12 through the upper elastic piece 71, the lower elastic piece 72 and the base 73. The end of the coil 43 facing the carrier 51 is sleeved on the carrier 51, and there is a distance between the coil 43 and the inner wall of the carrier 51, so that the first set of magnets 41 are located inside the carrier 51 and can move relative to the coil 43.

The sensor assembly 3 is located at an end of the coil 43 facing away from the lens assembly 2. The sensor assembly 3 includes a chip 31 and a circuit board 32 connected to the chip 31. The sensor assembly 3 is fixed on the tray 61, and the tray 61 is connected to the base 13 through flexible elastic sheets. The second set of magnets 42 is also fixed on the tray 61. The second set of magnets 42 are positioned opposite to the first set of magnets 41 and have opposite or same magnetic poles, so that when the coil 43 is energized by being provided with electric current, the first set of magnets 41 and the second set of magnets 41 can move in the opposite direction within the magnetic field of the coil 43.

Figure 4:
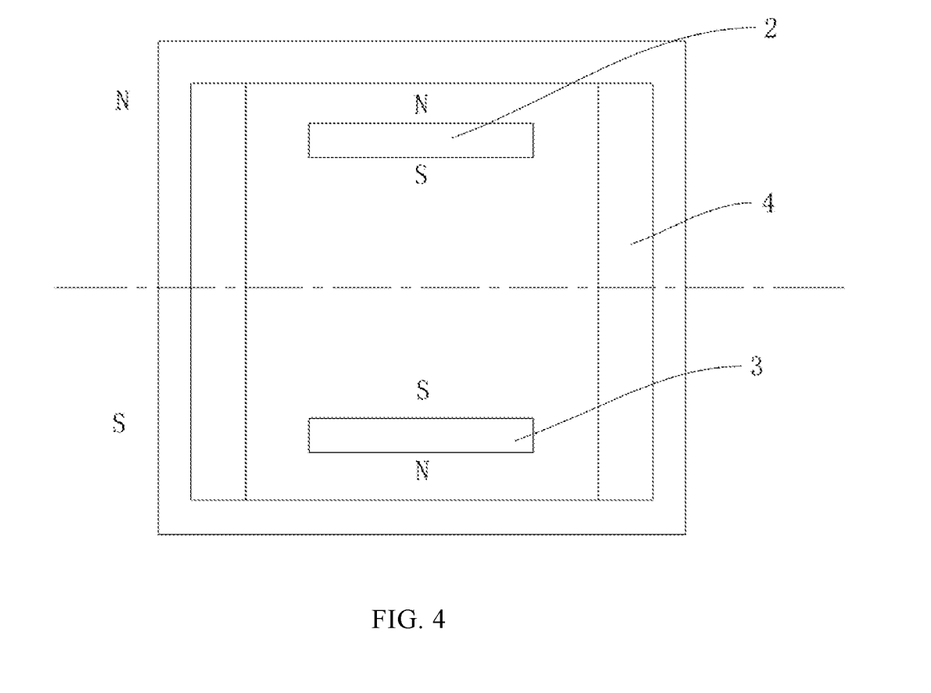
FIG. 4 illustrates a schematic diagram of the principle of a camera module according to one embodiment of the present disclosure.

FIG. 4 is a second schematic diagram of the principle of a camera module according to an embodiment of the present application.

Referring to FIG. 4, when the camera module is set on the electronic device, and the electronic device performs focusing processing based on the focusing control signal, the coil 43 generates, through an input driving current, a magnetic field corresponding to the driving current. Then in the magnetic field, based on the specific positions and specific magnetic poles of the first set of magnets 41 and the second set of magnets 42, the first set of magnets 41 and the second set of magnets 42 move in opposite directions in the horizontal plane of the casing 1, so that the relative distance between them increases or decreases to achieve the required amount of focus compensation. By the compensation amount, the electronic device can obtain high-quality image content captured through the camera module.

Figure 5:
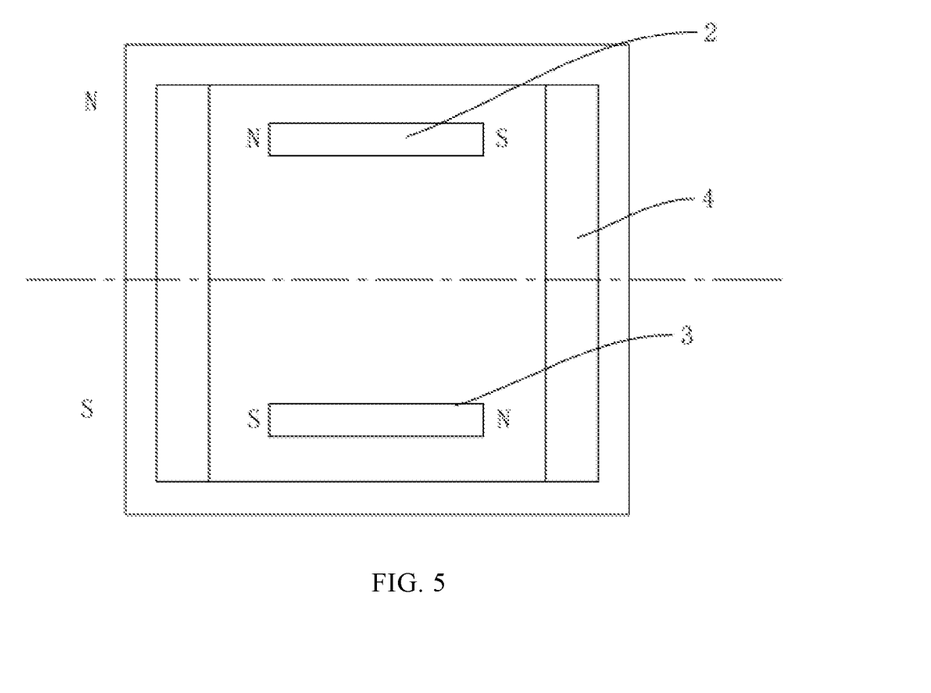
FIG. 5 illustrates a schematic diagram of the principle of a camera module according to one embodiment of the present disclosure.
Figure 6:
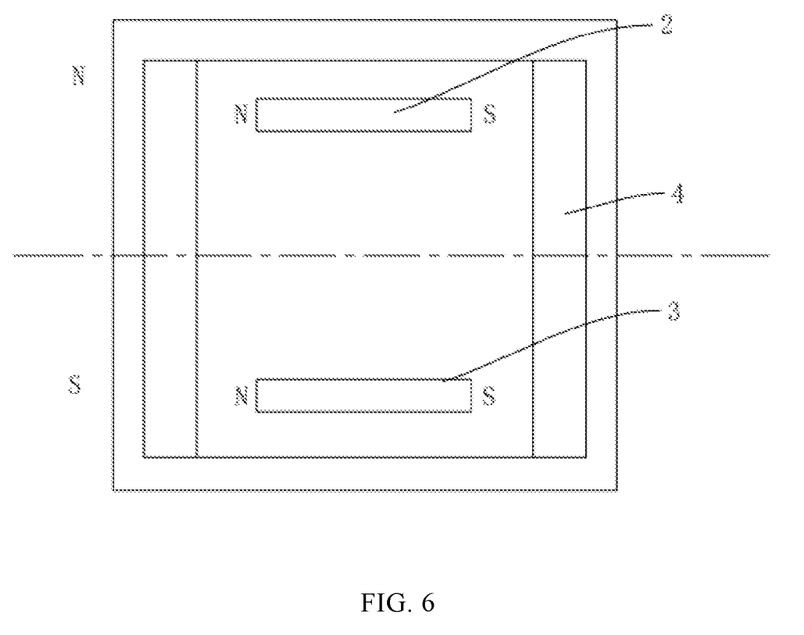
FIG. 6 illustrates a schematic diagram of the principle of a camera module according to one embodiment of the present disclosure.

FIG. 5 is a third schematic diagram of a principle of a camera module according to an embodiment of the present disclosure. FIG. 6 is a fourth schematic diagram of a principle of a camera module according to an embodiment of the present disclosure.

Referring to 5 and 6, when the camera module is set on the electronic device, and the electronic device performs image stabilization processing based on an image stabilization control signal, the coil 43 generates, through an input driving current, a magnetic field corresponding to the driving current. Then in the magnetic field, based on the specific positions and specific magnetic poles of the first set of magnets 41 and the second set of magnets 42, the first set of magnets 41 and the second set of magnets 42 move in opposite directions in the horizontal plane of the casing 1, so that the horizontal distance between them increases to achieve the required amount of image stabilization compensation. With the compensation amount, the electronic device can obtain high-quality image content captured through the camera module.

Figure 7:
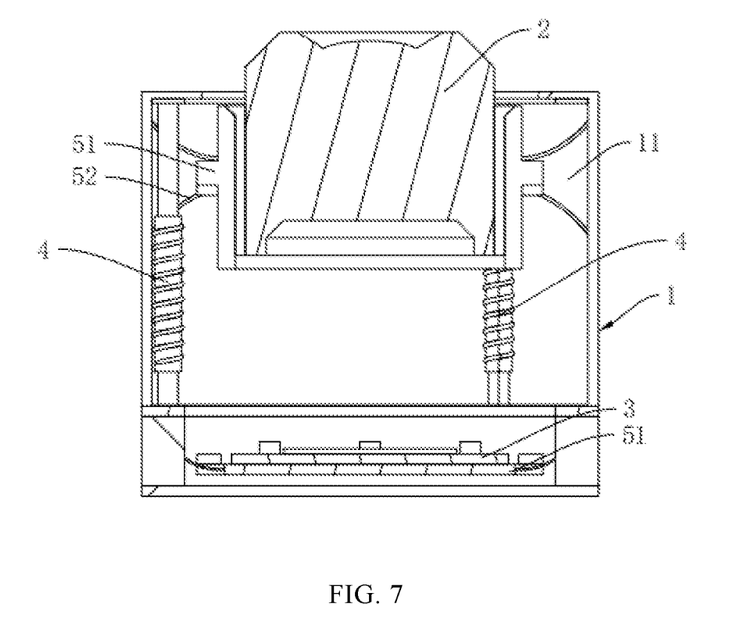
FIG. 7 illustrates a schematic cross-sectional view of a camera module according to one embodiment of the present disclosure.

FIG. 7 is a schematic cross-sectional view of a camera module according to another embodiment of the present disclosure.

Referring to FIG. 7, in another implementation scenario of the present disclosure, the driving force can also be generated by the arrangement of multiple coil arrays. Except for the coil arrangement, other structures and implementation methods in FIG. 7 are the same as those in FIG. 1 and will not be repeated below.

Figure 8:
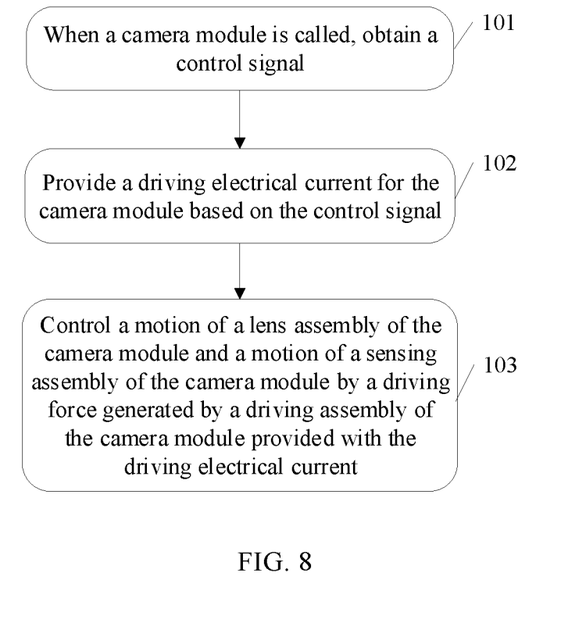
FIG. 8 illustrates a schematic diagram of a flowchart for an information processing method according to one embodiment of the present disclosure.

FIG. 8 is a schematic diagram illustrating an implementation flow chart of an information processing method according to an embodiment of the present disclosure.

Referring to FIG. 8, another aspect of the present disclosure provides an information processing method. The method may include: in operation 101, obtaining a control signal if/when the camera module is called; in operation 102, providing a driving electrical current for the camera module based on the control signal; and in operating 103, the driving current is used for the driving assembly 4 of the camera module to provide a driving force to control the movement of the lens assembly 2 of the camera module and/or the movement of the sensor assembly 3 of the camera module.

The information processing method disclosed in the present disclosure can be applied to the electronic device provided with the camera module of the above embodiments. The electronic device may be a mobile phone, a tablet computer or other electronic devices.

When an operator uses the camera module, the electronic device detects that the camera module is called. Corresponding control signals can be generated according to the operator's use scenarios. The control signals include but are not limited to focusing control signals, image stabilization control signals, etc. The control signals contain scene parameters and control contents corresponding to the use scene. The electronic device matches the drive current of the corresponding value according to the scene parameter and control content corresponding to the use scene based on the control signal. By controlling the driving current of the corresponding value, the driving current is supplied to the driving assembly 4, so that the driving assembly 4 provides a driving force to move the lens assembly 2 of the camera module and/or the camera module to a designated position, so as to form the required displacement, improve the imaging quality of the electronic device, and improve the operator's experience of using the electronic device.

In one embodiment, the operation 101 in which if the camera module is called, a control signal is obtained, may include: first, if the camera module is called, monitoring the sensing signal of the gyroscope; then, determining the image stabilization control signal based on the sensing signal.

Further, the control signal of the method is an image stabilization control signal. When the camera module is called, the electronic device monitors the sensing signal of the gyroscope. When the sensing signal meets a specified threshold, it indicates that the imaging of the electronic device needs to be subjected to image stabilization processing. In this case, the electronic device determines the image stabilization control signal based on the sensing signal. The image stabilization control signal contains the specific parameters of the sensing signal corresponding to the gyroscope. The degree of imaging jitter can be determined through the sensing signal, and the displacement compensation required by the lens assembly 2 and/or the sensor assembly 3 can be determined according to the degree of image jitter. That is, the driving current to be input can be determined according to the degree of jitter, so that the driving assembly 4 drives the lens assembly 2 and/or the sensor assembly 3 to achieve the required displacement compensation amount, so as to realize the image stabilization control of the electronic device.

Another aspect of the present disclosure provides an electronic device. The electronic device may include a camera module. The camera module can include: a casing 1, a lens assembly 2, a sensor assembly 3, and a driving assembly 4. The lens assembly 2 is movably connected to the casing 1. The lens assembly 2 includes a lens group 21 including a plurality of lenses. The lens group 21 is fixedly arranged in the lens barrel 22. The sensor assembly 3 is movably connected to the casing 1. The sensor assembly 3 is located under the lens assembly 2. Based on the control signal, the driving assembly 4 drives the lens assembly 2 and/or the sensor assembly 3 to move. The electronic device may further include a memory. The memory is configured for storing a computer program that can be executed by a processor. The electronic device may also include the processor. The processor is configured for obtaining control signals when executing the program.

In the present disclosure, the terms "one embodiment," "an embodiment," "some embodiments," "an example," "a specific example," or "some examples," etc., indicate that the specific features, structures, materials or characteristics described in connection with the embodiments or examples are included in at least one embodiment or example of the present disclosure. Furthermore, the particular features, structures, materials or characteristics described may be combined in any suitable manner in any one or more embodiments or examples. Furthermore, those skilled in the art may integrate and combine the different embodiments or examples described in this specification, as well as the features of the different embodiments or examples, without conflicting each other.

In addition, the terms "first" and "second" are only used for descriptive purposes, and should not be construed as indicating or implying relative importance or implying the number of indicated technical features. Thus, features delimited with "first" and/or "second" may expressly or implicitly include at least one of that feature. In the present disclosure, the terms "a plurality" and "multiple" means two or more, unless otherwise expressly and specifically defined.

The above description only describes specific exemplary embodiments of the present disclosure, but the protection scope of the present disclosure is not limited thereto. Modifications and/or replacements conceived by any person skilled in the art according to the technical scope disclosed in the present disclosure should be covered within the protection scope of the present disclosure. Therefore, the protect ion scope of the present disclosure shall be subject to the protection scope of the claims.

Other embodiments of the disclosure will be apparent to those skilled in the art from consideration of the specification and practice of the application disclosed herein. It is intended that the specification and examples be considered as exemplary only, with a true scope and spirit of the application being indicated by the claims.

What is claimed is:

1. A camera module, comprising:
   a casing;
   a lens assembly movably connected to the casing, the lens assembly including a lens group, the lens group including a plurality of lenses, and the lens group being fixedly arranged in a lens barrel;
   a sensor assembly movably connected to the casing, the sensor assembly being located under the lens assembly; and
   a driving assembly, the driving assembly driving the lens assembly and/or the sensor assembly to move based on a control signal, and the driving assembly including:
      a first set of magnets fixed with the lens assembly;
      a second set of magnets fixed with the sensor assembly; and a coil, wherein the first set of magnets and the second set of magnets are located within a spatial scope of the coil, the first set of magnets is located at a first end of the spatial scope of the coil, and the second set of magnets is located at a second end of the spatial scope of the coil.

2. The camera module according to claim 1, wherein:
the control signal is an image stabilization control signal;
the driving assembly drives the lens assembly and the sensor assembly to move simultaneously based on the image stabilization control signal; and
the lens assembly moves in a direction opposite to a direction of motion of the sensor assembly.

3. The cameral module according to claim 1, wherein:
the first set of magnets comprises a plurality of first magnets;
the second set of magnets comprises a plurality of second magnets; and
each first magnet and a corresponding second magnet have different magnetic poles.

4. The camera module according to claim 3, wherein:
the plurality of first magnets are fixedly arranged on a carrier;
the lens assembly, through the carrier and a first suspension connected to the carrier, is in a suspended state and moves under action of a first driving force;
the lens assembly moves in a horizontal plane relative to the casing;
the plurality of second magnets are fixedly arranged on a tray;
the sensor assembly, through the tray and a second suspension connected to the tray, is in a suspended state and moves under action of a second driving force; and
the sensor assembly moves in the horizontal plane relative to the casing.

5. The camera module according to claim 4, wherein:
the first suspension is a suspension wire; and
the second suspension is a flexible elastic sheet.

6. The camera module according to claim 4, wherein:
the coil generates the first driving force with the first set of magnets based on an electrical current provided according to the image stabilization control signal;
the coil generates the second driving force with the second set of magnets based on the electrical current provided according to the image stabilization control signal; and
a direction of the first driving force is different than a direction of the second driving force.

7. An information processing method, the method comprising:
obtaining a control signal when a camera module is called; and
providing a driving electrical current for the camera module, based on the control signal, wherein the driving electrical current is supplied to a driving assembly of the camera module to provide a driving force that controls a movement of a lens assembly of the camera module and/or a movement of a sensor assembly of the camera module;
wherein the driving assembly includes:
a first set of magnets fixed with the lens assembly;
a second set of magnets fixed with the sensor assembly; and
a coil, wherein the first set of magnets and the second set of magnets are located within a spatial scope of the coil, the first set of magnets is located at a first end of the spatial scope of the coil, and the second set of magnets is located at a second end of the spatial scope of the coil.

8. The method according to claim 7, the obtaining the control signal when the camera module is called, comprises:
when the camera module is called, monitoring a sensing signal of a gyroscope; and
determining an image stabilization control signal based on the sensing signal.

9. The method according to claim 7, wherein:
the control signal is an image stabilization control signal;
the driving assembly drives the lens assembly and the sensor assembly to move simultaneously based on the image stabilization control signal; and
the lens assembly moves in a direction opposite to a direction of motion of the sensor assembly.

10. The method according to claim 7, wherein:
the first set of magnets comprises a plurality of first magnets;
the second set of magnets comprises a plurality of second magnets; and
each first magnet and a corresponding second magnet have different magnetic poles.

11. The method according to claim 10, wherein:
the plurality of first magnets are fixedly arranged on a carrier;
the lens assembly, through the carrier and a first suspension connected to the carrier, is in a suspended state and moves under action of a first driving force;
the lens assembly moves in a horizontal plane relative to the casing;
the plurality of second magnets are fixedly arranged on a tray;
the sensor assembly, through the tray and a second suspension connected to the tray, is in a suspended state and moves under action of a second driving force; and
the sensor assembly moves in the horizontal plane relative to the casing.

12. An electronic device, comprising:
a camera module including: a casing, a lens assembly, a sensor assembly and a driving assembly; wherein:
the lens assembly is movably connected to the casing,
the lens assembly includes a lens group including a plurality of lenses,
the lens group is fixedly arranged in a lens barrel,
the sensor assembly is movably connected to the casing,
the sensor assembly is located under the lens assembly, and
the driving assembly drives the lens assembly and/or the sensor assembly to move based on a control signal, and the driving assembly includes:
a first set of magnets fixed with the lens assembly;
a second set of magnets fixed with the sensor assembly; and
a coil, wherein the first set of magnets and the second set of magnets are located within a spatial scope of the coil, the first set of magnets is located at a first end of the spatial scope of the coil, and the second set of magnets is located at a second end of the spatial scope of the coil;
a memory configured for storing computer programs executable on a processor; and
the processor configured to obtain the control signal when executing the computer programs.

13. The device according to claim 12, wherein:
the control signal is an image stabilization control signal;

the driving assembly drives the lens assembly and the sensor assembly to move simultaneously based on the image stabilization control signal; and the lens assembly moves in a direction opposite to a direction of motion of the sensor assembly.

14. The device according to claim 12, wherein:

the first set of magnets comprises a plurality of first magnets;

the second set of magnets comprises a plurality of second magnets; and each first magnet and a corresponding second magnet have different magnetic poles.

15. The device according to claim 14, wherein:

the plurality of first magnets are fixedly arranged on a carrier;

the lens assembly, through the carrier and a first suspension connected to the carrier, is in a suspended state and moves under action of a first driving force;

the lens assembly moves in a horizontal plane relative to the casing;

the plurality of second magnets are fixedly arranged on a tray;

the sensor assembly, through the tray and a second suspension connected to the tray, is in a suspended state and moves under action of a second driving force; and the sensor assembly moves in the horizontal plane relative to the casing.

16. The device according to claim 15, wherein:

the first suspension is a suspension wire; and the second suspension is a flexible elastic sheet.

17. The device according to claim 15, wherein:

the coil generates the first driving force with the first set of magnets based on an electrical current provided according to the image stabilization control signal;

the coil generates the second driving force with the second set of magnets based on the electrical current provided according to the image stabilization control signal; and a direction of the first driving force is different than a direction of the second driving force.

* * * * *